(12) United States Patent
Reznak (10) Patent No.: US 6,223,201 B1
(45) Date of Patent: Apr. 24, 2001

(54) DATA PROCESSING SYSTEM AND METHOD OF TASK MANAGEMENT WITHIN A SELF-MANAGING APPLICATION

(75) Inventor: Frederick John Reznak, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/708,135

(22) Filed: Aug. 27, 1996

(51) Int. Cl.$^7$ ............................................. G06F 9/00
(52) U.S. Cl. ............................................. 709/102
(58) Field of Search ................... 395/670–678; 709/100–108; 714/47

(56) References Cited

U.S. PATENT DOCUMENTS

| | | |
|---|---|---|
| 4,713,791 | 12/1987 | Saluski . |
| 5,210,872 * | 5/1993 | Ferguson et al. ............ 395/670 |
| 5,303,369 | 4/1994 | Borcherding et al. . |
| 5,325,525 | 6/1994 | Shan et al. . |
| 5,408,663 * | 4/1995 | Miller ............................. 395/570 |
| 5,446,894 * | 8/1995 | DeMar et al. . |
| 5,572,672 * | 11/1996 | Dewitt et al. . |

OTHER PUBLICATIONS

Kuo et al, "Load Adjustment in Adaptive real–time systems", IEEE Electronic library, 1991.*

Haban et al; "Application of Real–time Monitoring to Scheduling Tasks with Randon Execution Times", IEEE Transactions of Software Engineering, vol. 16, No. 12, Dec. 1990.*

Davis et al; "Scheduling Slack Time in Fixed Priority Pre–emptive Systems", IEEE, 1993.*

Dar–Tzen Peng; "Bounds of Start and Completion Times of Application Tasks on the RTEM System", IEEE, 1993.*

Lehoczky et al; "An Optimal Algorithm for Scheduling Soft–Aperiodic Tasks in Fixed–Priority Preemptive Systems", IEEE, 1992.*

* cited by examiner

Primary Examiner—Majid A. Banankhah
Assistant Examiner—P. Caldwell
(74) Attorney, Agent, or Firm—Gerald R. Woods; Felsman, Bradley, Vaden, Gunter & Dillon, LLP (57) ABSTRACT

A data processing system and method of task management within a self-managing application program including a number of tasks and a processing time monitor are disclosed. In accordance with the present invention, a selected portion of processing time is allocated to each of the tasks in the self-managing application and the tasks are executed by the data processing system. Utilizing the processing time monitor, a determination is periodically made whether an actual portion of processing time utilized by each of the tasks exceeds the selected portion of processing time allocated to that task. In response to a determination that an actual portion of processing time utilized by a particular task exceeds the selected portion of processing time allocated that task, execution of the particular task is suspended for a selected penalty time. In one embodiment, the penalty time is selected such that following the expiration of the penalty time, the actual portion of processing time utilized by the particular task will be no greater than the selected portion of processing time allocated to the particular task.

20 Claims, 5 Drawing Sheets

DATA PROCESSING SYSTEM AND METHOD OF TASK MANAGEMENT WITHIN A SELF-MANAGING APPLICATION

BACKGROUND OF THE INVENTION

1. Technical Field

The present invention relates in general to a method and system for data processing and in particular to method and system for task management within a multitasking data processing system. Still more particularly, the present invention relates to a data processing system and method of task management within a self-managing application.

2. Description of the Related Art

Operating systems such as DOS (Disk Operating System) initially permitted only one task or process to be performed at a time. Thus, for example, a user of a word processing application could not print a first document while typing a second document. In order to permit multiple tasks to be executed concurrently (at least from a user's perspective), multitasking operating systems were developed. In general, multitasking operating systems can be classified as either cooperative or time-slice, depending upon the manner in which the operating systems allocate processing time to tasks.

Cooperative multitasking operating system classify tasks as either foreground or background tasks. Background tasks are granted processing time only during idle periods of the foreground tasks, such as periods when the foreground tasks are performing input and output operations. Time-slice multitasking operating systems, in contrast, allocate processing time (i.e., time slices) to each task in round robin fashion or based upon task priority.

Time-slice multitasking operating systems are often viewed as preferable to cooperative multitasking operating systems because background tasks running under cooperative multitasking operating systems receive insufficient processing time if the concurrent foreground tasks have minimal idle periods. Time-slice multitasking operating systems, however, are also subject to deficiencies. For example, conventional time-slice multitasking operating systems do not include facilities to detect an endless program loop in a task, which can lock out the operating system and prevent other tasks from receiving processing time. Similarly, in priority-based time-slice multitasking operating systems, a high priority task can prevent lower priority tasks from receiving adequate processing time. In addition, time-slice multitasking operating systems frequently preempt execution of well-behaved tasks that are not overusing the available processing resources, thereby incurring context switching delays.

In response to these deficiencies in conventional multitasking operating systems, multitasking operating systems have recently been developed which include scheduling facilities that utilize processing time estimates provided by tasks prior to dispatch to allocate processing resources to the tasks. However, for data processing systems that do not utilize a multitasking operating system with such scheduling facilities, a method for task management is needed that regulates the processing time allocated to each of a plurality of concurrent tasks.

SUMMARY OF THE INVENTION

It is therefore one object of the present invention to provide a method and system for data processing.

It is another object of the present invention to provide a method and system for task management within a multitasking data processing system.

It is yet another object of the present invention to provide a data processing system and method of task management within a self-managing application.

The foregoing objects are achieved as is now described. A data processing system and method of task management within a self-managing application program including a number of tasks and a processing time monitor are disclosed. In accordance with the present invention, a selected portion of processing time is allocated to each of the tasks in the self-managing application and the tasks are executed by the data processing system. Utilizing the processing time monitor, a determination is periodically made whether an actual portion of processing time utilized by each of the tasks exceeds the selected portion of processing time allocated to that task. In response to a determination that an actual portion of processing time utilized by a particular task exceeds the selected portion of processing time allocated that task, execution of the particular task is suspended for a selected penalty time. In one embodiment, the penalty time is selected such that following the expiration of the penalty time, the actual portion of processing time utilized by the particular task is no greater than the selected portion of processing time allocated to the particular task.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
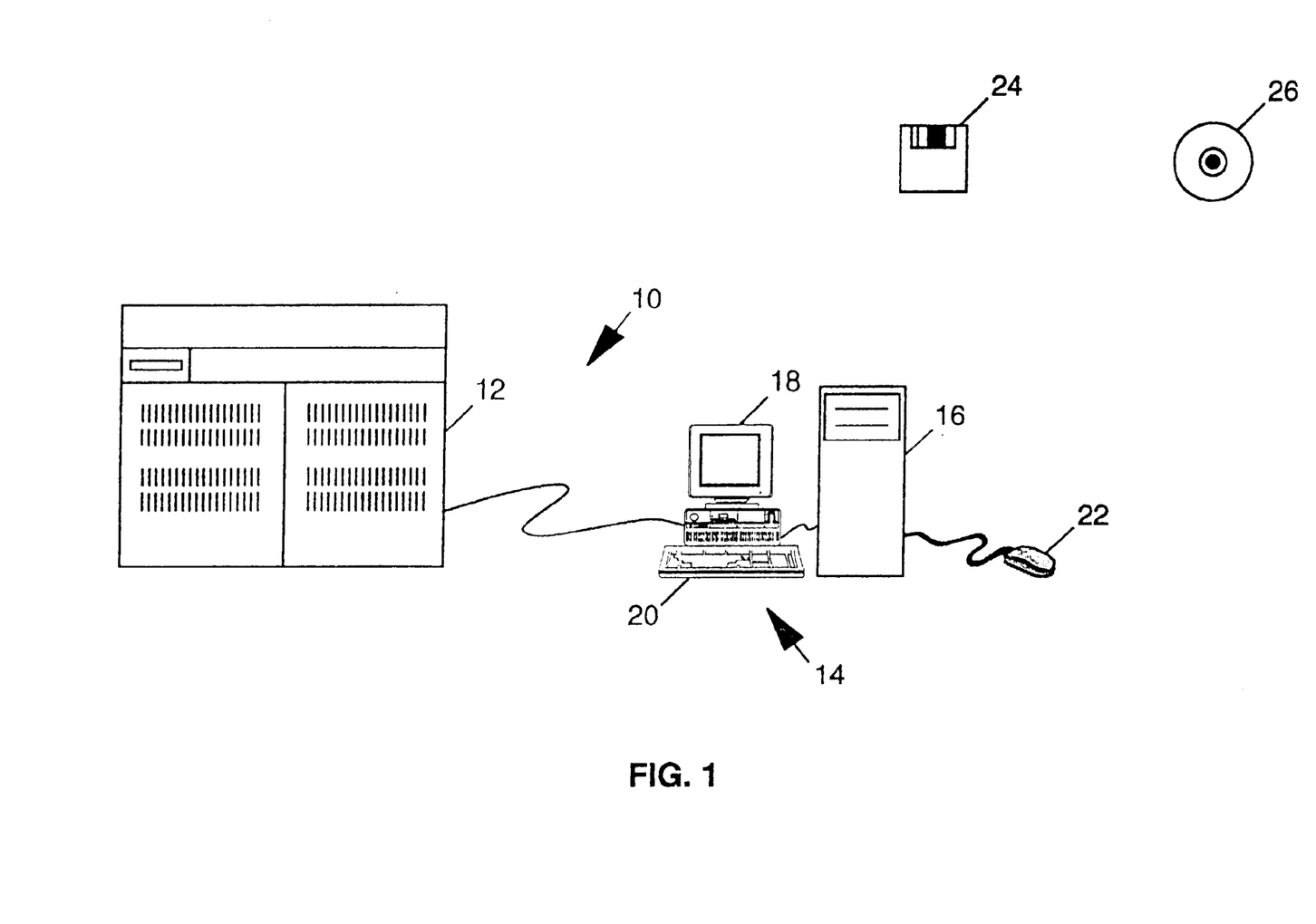
FIG. 1 depicts an illustrative embodiment of a data processing system with which the present invention can advantageously be utilized.

With reference now to the figures and in particular with reference to FIG. 1, there is depicted an illustrative embodiment of a data processing system in accordance with the present invention. As illustrated, data processing system 10 comprises system unit 12 and one or more local nodes 14, which include personal computer 16, display device 18, keyboard 20, and mouse 22. As is well-known to those skilled in the art, personal computer 16 can receive input data via keyboard 20, mouse 22, or other suitable user input device. In addition, personal computer 16 can retrieve data and application programs for processing that reside within recordable media such as diskette 24 and CD-ROM 26. The user can execute an application locally utilizing personal computer 16, or invoke execution of the application on system unit 12 or a remote node 14 utilizing well-known network communication techniques. System unit 12 and personal computer 16 output data to a user via display device 18.

Figure 2:
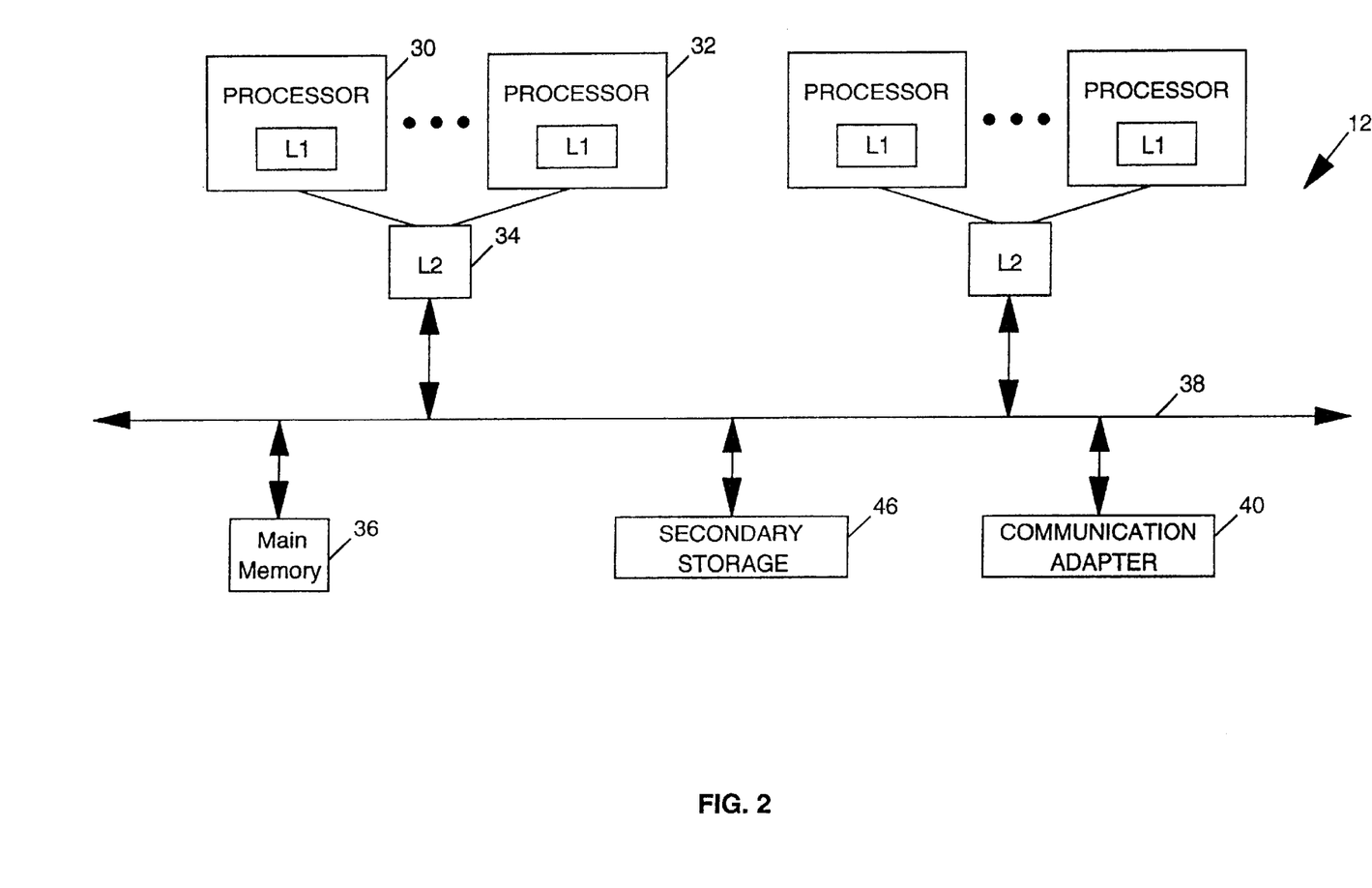
FIG. 2 illustrates a more detailed block diagram representation of the processing unit depicted in FIG. 1.

Referring now to FIG. 2, a high level block diagram of system unit 12 is illustrated. System unit 12 preferably comprises a mainframe computer such as the IBM System/390, but could alternatively comprise a workstation such as the IBM RISC System/6000. System unit 12 includes one or more processors 30, which are each capable of executing a task (i.e., thread) within one of a number of concurrently executing multi-task applications. Each processor 30 has an on-board level one (L1) cache 32 and an associated level two (L2) cache 34 that provide high speed storage for instructions and data. Additional storage for instructions and data is provided by main memory 36 and secondary storage 46, which communicate with each L2 cache 34 via system bus 38. As is typical of multitasking data processing systems, each application executing within system unit 12 is allocated its own virtual memory space, which is mapped partially into main memory 36 and partially into secondary storage 46 by a memory manager. System unit 12 also includes communication adapter 40 through which multiple nodes 14 can access system resources available within system unit 12. As will be appreciated by those skilled in the art, system unit 12 includes additional hardware coupled to system bus 38 that is not necessary for an understanding of the present invention and is accordingly omitted for simplicity.

Figure 3:
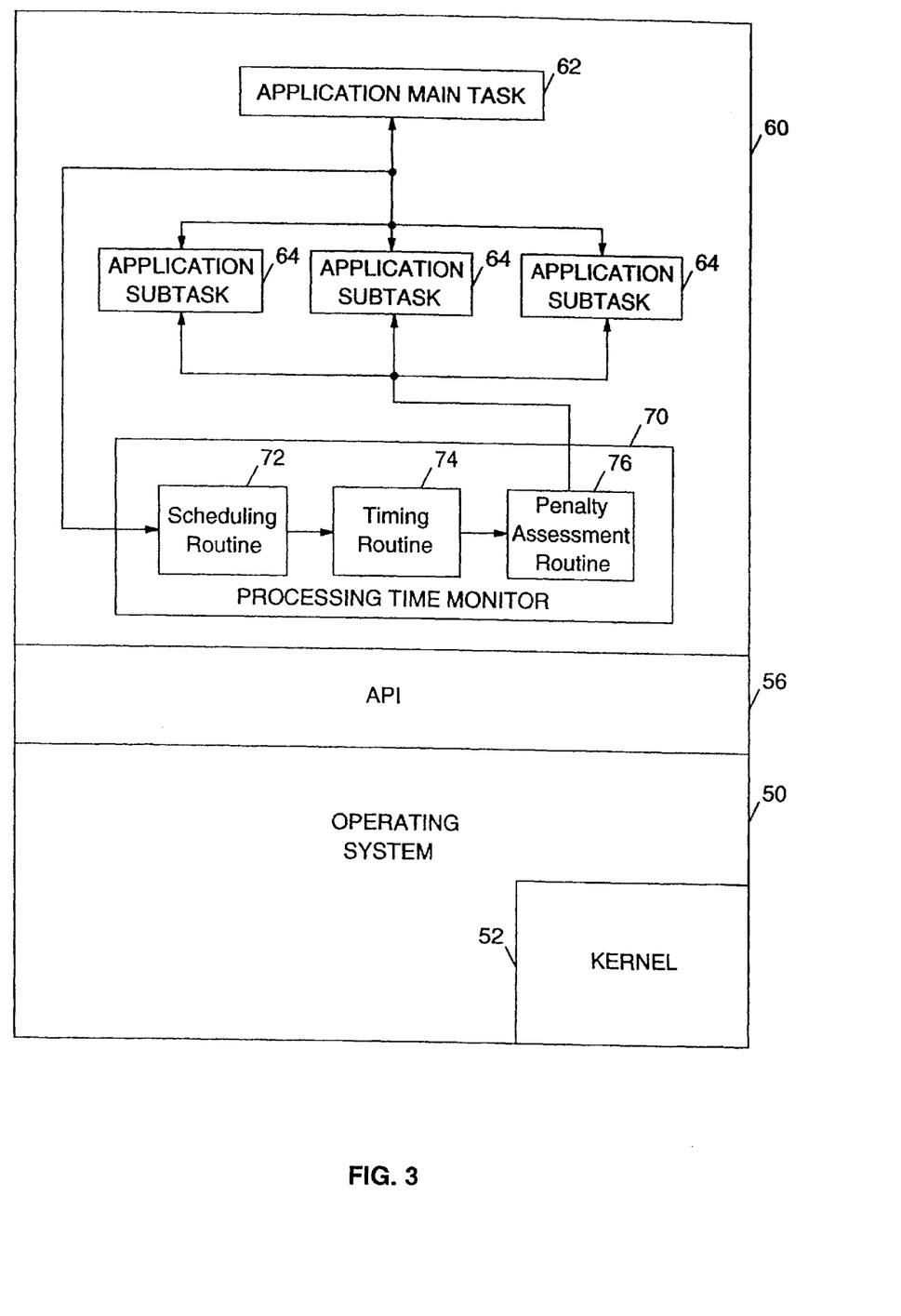
FIG. 3 is a layer diagram depicting the software configuration of the data processing system illustrated in FIG. 1, which includes a self-managing application in accordance with the present invention.

With reference now to FIG. 3, there is depicted a layer diagram of the software configuration of system unit 12. As illustrated, the software configuration of system unit 12 includes a priority-based multitasking operating system 50 such as MVS (Multiple Virtual Storage), which controls both the operation of system unit 12 and the allocation of system resources to processes executing within system unit 12. Operating system 50 includes kernel 52, which is the layer of operating system 50 that interacts most directly with hardware. Kernel 52 implements system services, performs memory management, controls network access, implements one or more file systems, and schedules and dispatches tasks for execution. In accordance with the present invention, kernel 52 schedules tasks for execution based upon priority order and without regard to the processing time each task requires. Following the dispatch of tasks for execution by processors 30, kernel 52 monitors the cumulative processing time utilized by each task as part of its system services, which are accessible to application programs via Application Programming Interface (API) 56.

Still referring to FIG. 3, the software configuration of system unit 12 further includes self-managing application 60, which controls the processing time utilized by each of its subtasks. As illustrated, self-managing application 60 includes an application main task 62 to which several application subtasks 64 are attached. Application subtasks 64 comprise schedulable units of the work to be accomplished by self-managing application 60 and each have an associated set of attributes, including task privileges and a task priority. In accordance with the present invention, self-managing application 60 further includes processing time monitor 70, which monitors and controls the amount of processing time utilized by application subtasks 64. Processing time monitor 70 includes scheduling routine 72, which is assigned the highest priority of all tasks attached to application main task 62, as well as timing routine 74, which executes as an interrupt on scheduling routine 72, and penalty assessment routine 76, which executes as an interrupt on application subtasks 64.

Figure 4:
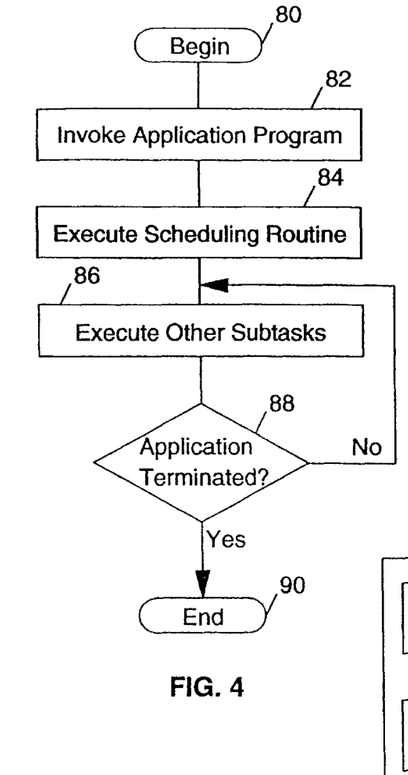
FIG. 4 is a flowchart illustrating the execution of the self-managing application depicted in FIG. 3.

Referring now to FIG. 4, there is illustrated a high level logical flowchart of a method of executing a self-managing application on system unit 12 of data processing system 10. As illustrated, the process begins at block 80 and thereafter proceeds to block 82, which illustrates the invocation of self-managing application 60 either by a user of data processing system 10 or by automation. The command invoking self-managing application 60 has an optional input parameter that permits a user to specify the percentage of processing time to be utilized by each of application subtasks 64. If no input parameter is supplied, a default percentage of processing time is allocated to each application subtask 64 by application main task 62 following invocation of self-managing application 60. In either event, the percentage of processing time allocated to each application subtask 64 can be reset by a user or by automation during execution of self-managing application 60. Following the invocation of self-managing application 60 at block 82, the process proceeds to block 84, which depicts the execution of scheduling routine 72 by processors 30. As noted above, scheduling routine 72 has a higher priority than each of application subtasks 64 and is therefore scheduled and executed first.

Figure 5:
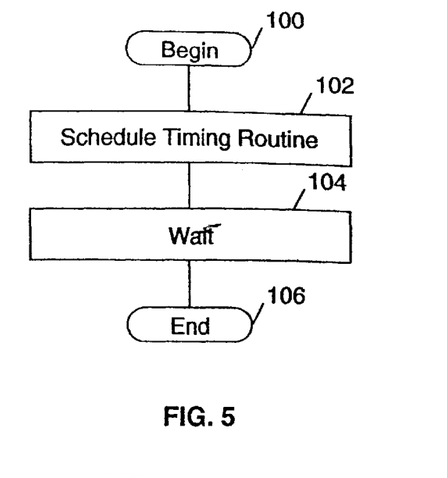
FIG. 5 is a flowchart depicting the execution of the scheduling routine of the self-managing application.

With reference now to FIG. 5, there is depicted a high level logical flowchart of the execution of scheduling routine 72. As depicted, the process begins at block 100 and thereafter proceeds to block 102, which depicts scheduling routine 72 scheduling timing routine 74 to run as an interrupt after the expiration of a specified interval, for example, 10 s. Scheduling routine 72 then passes into a idle state, as illustrated at block 104, until the end of self-managing application 60. Scheduling routine 72 then terminates at block 106 when self-managing application program 60 ends.

Returning to FIG. 4, the process proceeds from block 84 to block 86, which illustrates the execution of application subtasks 64 by processors 30. As described above, application subtasks 64 are scheduled for execution by kernel 52 in order of their associated priorities. As illustrated at block 88, the execution of application of subtasks 64 continues until self-managing application 60 receives a command to terminate execution. Thereafter, execution of self-managing application 60 terminates at block 90.

Figure 6:
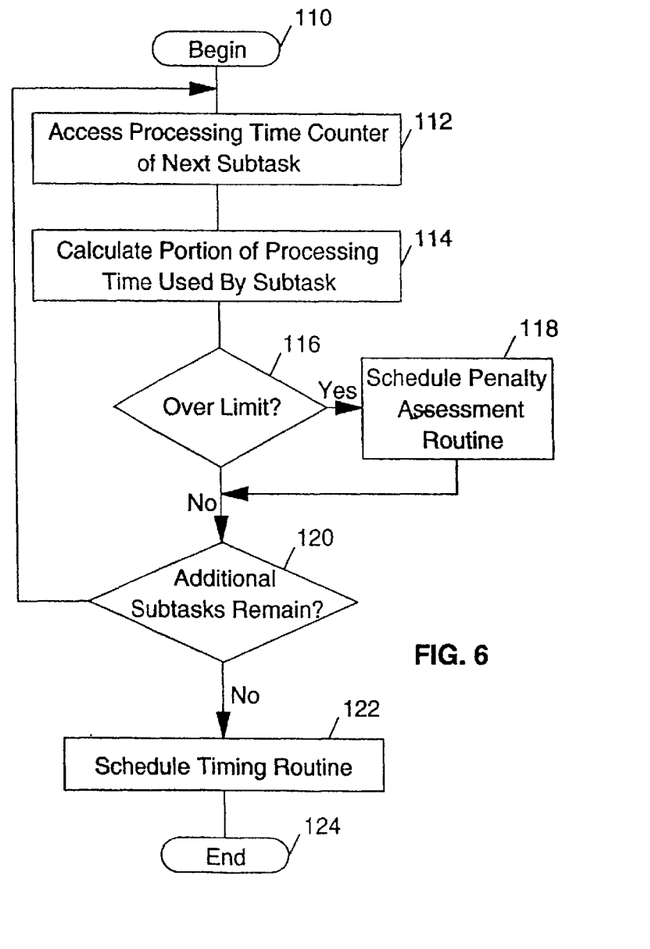
FIG. 6 is a flowchart illustrating the execution the timing routine of the self-managing application.

Referring now to FIG. 6, there is illustrated a high level logical flowchart of the execution of timing routine 74. As noted above, timing routine 74, which is first scheduled to execute by scheduling routine 72 following the expiration of a selected interval, runs as an interrupt on scheduling routine 74, also interrupting whatever application subtask 64 is then executing. As illustrated, the process begins at block 110 and then proceeds to block 112, which depicts timing routine 74 accessing the cumulative processing time counter maintained by kernel 52 for a first of application subtasks 64 via API 56. The process then proceeds to block 114, which illustrates timing routine 74 calculating the portion of processing time utilized by the first application subtask 64. In accordance with a preferred embodiment of the present invention, the portion of processing time utilized by the application subtask 64 is determined on both a short term and a long-term basis. For example, the short-term processing time utilized by an application subtask 64 can be calculated by subtracting the cumulative processing time prior to the interval from the current value of the cumulative processing time to obtain the amount of processing time utilized during the interval and then dividing the processing time utilized during the interval by the interval duration. A long-term utilization percentage can similarly be obtained by calculating the utilization percentage over multiple intervals. Following the calculation of the portion of processing time utilized by the first application subtask 64, the process passes to block 116, which illustrates a determination of whether or not the portion of processing time utilized by the first application subtask 64 is greater than the allocated portion. If not, the process passes to block 120.

However, in response to a determination that the portion of processing utilized by the first application subtask 64 is greater than the allocated amount, the process proceeds to block 118, which illustrates timing routine 74 scheduling penalty assessment routine 76 to execute on the first application subtask 64. The process then passes to block 120. Block 120 depicts a determination of whether or not additional application subtasks 64 remain to be processed. If so, the process returns to block 112, which has been described. However, in response to a determination that all application subtasks 64 have been processed, the process to block 122, which illustrates scheduling timing routine 74 to again execute after a specified interval (e.g., 10 s) has elapsed. Thereafter, timing routine 74 terminates at block 124.

Figure 7:
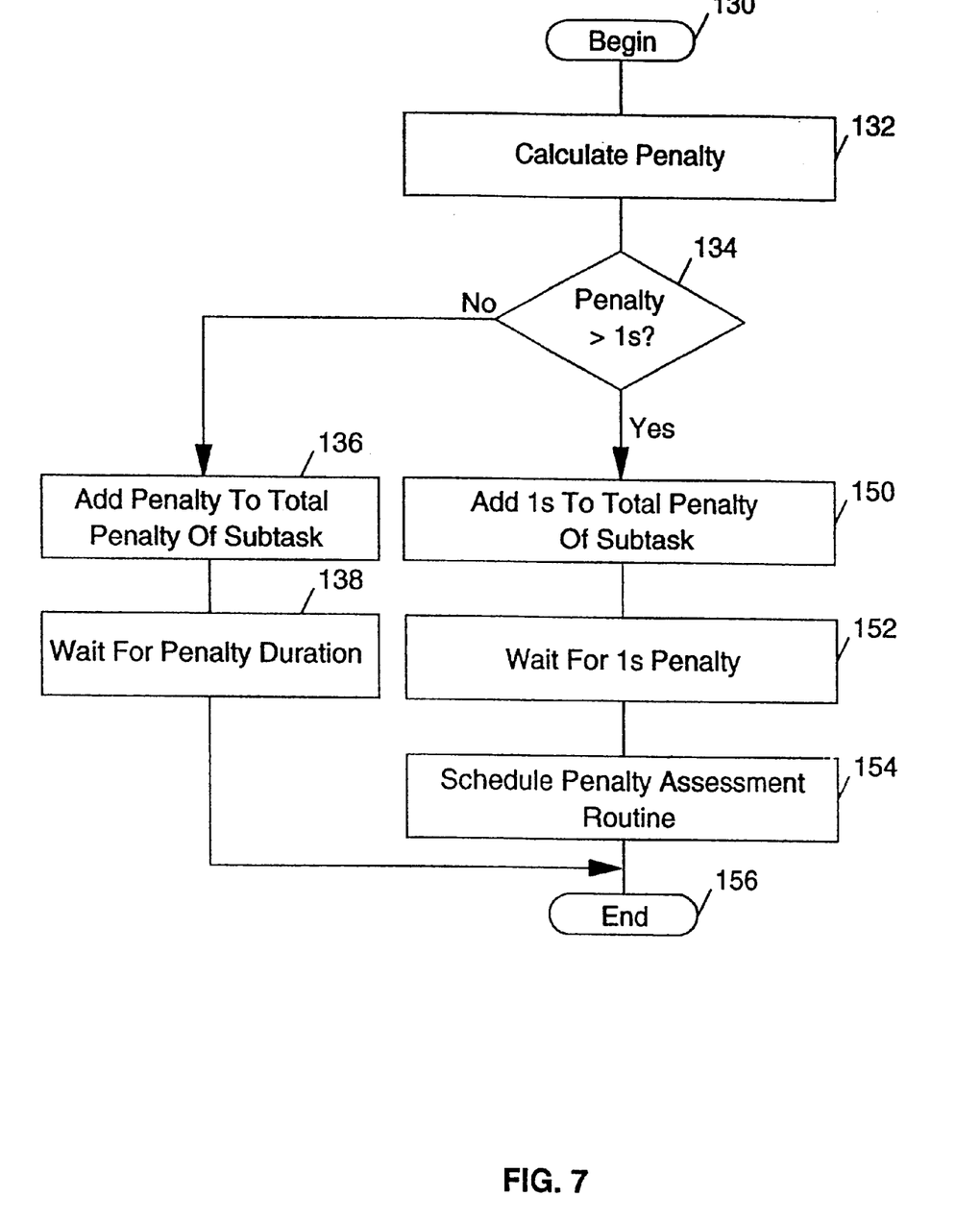
FIG. 7 is a flowchart depicting the execution of the penalty assessment routine of the self-managing application.

With reference now to FIG. 7, there is depicted a high level logical flowchart of the execution of penalty assessment routine 76, which runs as an interrupt on each application subtask 64 that was determined by timing routine 74 to have exceeded its allocated portion of processing time. As illustrated, penalty assessment routine 76 begins at block 130 and thereafter proceeds to block 132, which illustrates penalty assessment routine 76 calculating a penalty time for which execution of an application subtask 64 is to be suspended. In accordance with a first embodiment of the present invention, the penalty time is selected such that following the expiration of the penalty time, the percentage of processing time utilized by the application subtask 64 is no greater than the allocated percentage of processing time. Thus, the penalty time (P) can calculated from the processing time (PT) and interval duration utilizing the following formula:

$$P = (PT \text{ utilized}) / (\% \text{ of } PT \text{ allocated}) - \text{interval duration}$$

Either short-term or long-term processing time utilization data can be used in the penalty time calculation, depending upon what type of task management is desired. Using short-term data provides a quicker response to overuse of processing resources and provides a limit to peak task activity. The use of long-term data, on the other hand, permits an application subtask 64 to execute with high processing time utilization if the application subtask 64 was previously idle for an extended period. In an alternative embodiment of the present invention, a hybrid approach can be implemented that reduces the calculated penalty if the short-term processing time utilization of an application subtask 64 exceeds the allocated processing time, but the long-term processing time utilization does not.

Following block 132, the process proceeds to block 134, which illustrates a determination of whether or not the penalty is longer than one second. If not, the process proceeds to blocks 136 and 138, which illustrate adding the penalty to a total penalty counter for the application subtask 64 and then suspending execution of the application subtask 64 for the duration of the penalty. The total penalty counter permits a user or an application program to intervene in the execution of self-managing application 60 if the total penalty incurred by the application subtask 64 exceeds a selected amount. For example, a user may desire to allocate a greater percentage of processing time to an application subtask 64 that accumulates a large total penalty. Thereafter, the process passes from block 138 to block 156, where penalty assessment routine 76 terminates.

Returning to block 134, if a determination is made that the penalty is longer than one second, the process proceeds to block 150, which depicts adding one second to the total penalty accumulated by the application subtask 64. Next, at block 152, execution of the application subtask 64 is suspended for the one second penalty added to the total penalty counter at block 150. The process then passes to block 154, which depicts scheduling a penalty assessment interrupt on the same application subtask 64 after the expiration of a very short interval, for example, a hundredth of a second. Thus, in the depicted embodiment, application subtasks 64 that are penalized for more than one second are permitted to execute at less than one percent of processor time utilization while the penalty is being served. Granting highly penalized application subtasks 64 a small amount of processing time permits resource interlocks to be resolved so that the subtask penalization does not prevent well-behaved application subtasks 64 from accessing vital resources. The process then passes from block 154 to block 156 and terminates.

As has been described, the present invention provides a self managing application program, which automatically controls the amount of processing time utilized by its subtasks. In the described embodiment of the present invention, the portion of processing time utilized by each application subtask is periodically determined, and, if the portion of processing time utilized by a particular application subtask exceeds its allocated portion, the particular subtask is penalized. In an alternative embodiment of the present invention, the portion of processing time utilized by each application subtask is not calculated; instead, only the penalty incurred by each application subtask is calculated. In this embodiment, an application subtask is assessed a penalty only if its calculated penalty is positive.

It is important to note that while the present invention has been described as a self-managing application executing within a data processing system, those skilled in the art will appreciate that the mechanisms of the present invention are capable of being distributed as a program product residing in a variety of signal-bearing media, including both recordable media such as magnetic and optical disks and transmission media such as digital and analog communications links.

While the invention has been particularly shown and described with reference to a preferred embodiment, it will be understood by those skilled in the art that various changes in form and detail may be made therein without departing from the spirit and scope of the invention.

What is claimed is:

1. A method of task management in a data processing system having an operating system and a self managing application program including a plurality of subtasks and a processing time monitor, said method comprising:

executing an operating system scheduler to schedule execution of tasks by said data processing system, wherein said operating system scheduler schedules said self-managing application for execution as a task without regard to processing time required; and in response to said operating system scheduler scheduling said self managing application as a task to run on said data processing system:

said self-managing application program allocating a respective selected portion of processing time to each of said plurality of subtasks within said self-managing application;

executing said plurality of subtasks within said data processing system;

at each of a plurality of regular intervals, utilizing said processing time monitor of said self-managing application to determine, for all of said plurality of subtasks, whether an actual portion of processing time utilized by each subtask among said plurality of subtasks exceeds its respective selected portion of processing time; and in response to a determination by said processing time monitor that said actual portion of processing time utilized by a particular subtask among said plurality of subtasks exceeds its respective selected portion of processing time, suspending execution of said particular subtask for a selected penalty time, wherein said processing time monitor calculates said selected penalty time and suspends execution of said particular subtask.

2. The method of task management of claim 1, said plurality of subtasks including a first subtask and a second subtask, wherein said step of allocating a selected portion of processing time to each of a plurality of subtasks includes the steps of:

allocating a first portion of processing time to a first subtask having a first priority; and allocating a second portion of processing time to a second subtask having a second priority, wherein said second portion of processing time is less than said first portion of processing time and said second priority is higher than said first priority.

3. The method of task management of claim 1, wherein said step of allocating a selected portion of processing time to each of said plurality of subtasks comprises allocating a selected portion of processing time to at least one subtask among said plurality of subtasks during execution of said at least one subtask.

4. The method of task management of claim 1, wherein said step of periodically determining whether an actual portion of processing time utilized by each of said plurality of subtasks exceeds said selected portion is performed at each of a plurality of intervals, and wherein said actual portion of processing time is determined for each of said plurality of subtasks over a time period including multiple of said plurality of intervals.

5. The method of task management of claim 1, wherein said step of suspending execution of said particular subtask for a selected penalty time comprises permitting execution of said particular subtask between multiple delays that have an overall duration equal to said selected penalty time.

6. The method of task management of claim 1, wherein said step of suspending execution of said particular subtask for a selected penalty time comprises suspending execution of said particular subtask for a penalty time selected such that following expiration of said penalty time said actual portion of processing time utilized by said particular subtask will be no greater than said selected portion of processing time allocated to said particular subtask.

7. The method of task management of claim 1, said method further comprising scheduling said processing time monitor to run at a higher priority than said plurality of subtasks.

8. The method of claim 1, wherein suspending execution of said particular subtask for a selected penalty time comprises suspending execution of said particular subtask while executing another of said plurality of subtasks of said self-managing application.

9. A program product, comprising:

a self-managing application including:

a plurality of subtasks for execution within a data processing system;

a processing time monitor that, responsive to an operating system scheduler scheduling said self-managing application to run as a task, allocates each of said plurality of subtasks a respective selected portion of processing time, and that, at each of a plurality of regular intervals, determines, for all of said plurality of subtasks, whether an actual portion of processing time utilized by each of said plurality of subtasks exceeds its selected portion, and that, responsive to a determination that an actual portion of processing time utilized by a particular subtask among said plurality of subtasks exceeds its selected portion, calculates a selected penalty time and suspends execution of said particular subtask for said selected penalty time; and a signal-bearing media bearing said self-managing application.

10. The program product of claim 8, wherein each of said plurality of subtasks has a priority, and wherein said selected portion of processing time allocated to each of said plurality of subtasks is independent of a respective priority of each of said plurality of subtasks.

11. The program product of claim 9, wherein said processing time monitor determines said actual portion of processing time utilized by each of said plurality of subtasks at each of a plurality of intervals, and wherein said actual portion of processing time is determined for each of said plurality of subtasks over a time period including multiple of said plurality of intervals.

12. The program product of claim 8, wherein said processing time monitor suspends execution of said particular subtask for said selected penalty time by permitting execution of said particular subtask between multiple delays that have an overall duration equal to said selected penalty time.

13. The program product of claim 8, wherein said processing time monitor suspends execution of said particular subtask for a selected penalty time by suspending execution of said particular subtask for a penalty time selected such that following expiration of said penalty time said actual portion of processing time utilized by said particular subtask will be no greater than said selected portion of processing time allocated to said particular subtask.

14. The program product of claim 8, wherein said processing time monitor has a higher priority than all of said plurality of subtasks.

15. A data processing system, comprising:

a processing unit for executing instructions;

a memory coupled to said processing unit; and a self-managing application program and an operating system stored within said memory and executable by said processing unit, wherein said operating system includes an operating system scheduler that schedules said self-managing application as a task for execution without regard to processing time required, and wherein said self-managing application program includes:

a plurality of subtasks for execution by said processing unit; and a processing time monitor that, responsive to said operating system scheduler scheduling said self-managing application as a task to be executed by said processing unit, allocates each of said plurality of subtasks a respective selected portion of processing time, and that, at each of a plurality of regular intervals, determines, for all of said plurality of subtasks, whether an actual portion of processing time utilized by each of said plurality of subtasks exceeds its selected portion, and that, responsive to a determination that an actual portion of processing time utilized by a particular subtask among said plurality of subtasks exceeds its selected portion, calculates a selected penalty time and suspends execution of said particular subtask for said selected penalty time.

16. The data processing system of claim 14, wherein each of said plurality of subtasks has a priority and said data processing system dispatches subtasks according to priority order, said selected portion of processing time allocated to each of said plurality of subtasks being independent of a respective priority of each of said plurality of subtasks.

17. The data processing system of claim 14, wherein said processing time monitor determines said actual portion of processing time utilized by each of said plurality of subtasks at each of a plurality of intervals, and wherein said actual portion of processing time is determined for each of said plurality of subtasks over a time period including multiple of said plurality of intervals.

18. The data processing system of claim 14, wherein said processing time monitor suspends execution of said particular subtask for said selected penalty time by permitting execution of said particular subtask between multiple delays that have an overall duration equal to said selected penalty time.

19. The data processing system of claim 14, wherein said processing time monitor suspends execution of said particular subtask for a selected penalty time by suspending execution of said particular subtask for a penalty time selected such that following expiration of said penalty time said actual portion of processing time utilized by said particular subtask will be no greater than said selected portion of processing time allocated to said particular subtask.

20. The data processing system of claim 14, wherein said processing time monitor has a higher priority than all of said plurality of subtasks.

\* \* \* \* \*